United States Patent [19]

Connors, Jr. et al.

[11] Patent Number: 4,705,071
[45] Date of Patent: Nov. 10, 1987

[54] STEAM CONTROL VALVE WITH IMPROVED MUFFLER PORTION

[75] Inventors: Herman J. Connors, Jr., Monroeville; Francis A. Kramer, Hampton Township, Allegheny County, both of Pa.

[73] Assignee: Westinghouse Electric Corp., Pittsburgh, Pa.

[21] Appl. No.: 806,568

[22] Filed: Dec. 9, 1985

[51] Int. Cl.$^4$ ............ G21C 9/00; F16K 47/00
[52] U.S. Cl. ............ 137/625.3; 137/625.37; 251/121; 376/277; 376/203; 376/402; 376/463
[58] Field of Search ............ 376/277, 283, 352, 402, 376/378, 389, 391, 234, 365, 463, 203; 137/543.19, 625.37, 625.3; 251/121

[56] References Cited

U.S. PATENT DOCUMENTS

| | | |
|---|---|---|
| 1,022,171 | 4/1912 | Ballard ............ 137/543.19 |
| 2,192,425 | 3/1940 | Allen et al. ............ 137/543.19 |
| 3,417,776 | 12/1968 | Ludwig ............ 137/543.19 |
| 3,830,255 | 8/1974 | Freiheit ............ 137/543.19 |
| 3,854,496 | 12/1974 | Broszeit ............ 137/543.19 |
| 4,039,003 | 8/1977 | Cheek ............ 137/543.19 |
| 4,245,412 | 1/1981 | Schabert et al. ............ 376/277 |
| 4,280,871 | 7/1981 | Hoffmann ............ 376/277 |

*Primary Examiner*—Deborah L. Kyle
*Assistant Examiner*—Daniel Wasil
*Attorney, Agent, or Firm*—Daniel C. Abeles

[57] ABSTRACT

A steam control value for a steam chest such as used in a nuclear plant with an improved muffler portion. The muffler portion includes window openings of predetermined dimensions. A ring portion is below the window opening having a plurality of pockets. Each pocket is aligned with one of the window openings. This design greatly reduces vibrations which may damage the valve.

3 Claims, 8 Drawing Figures

STEAM CONTROL VALVE WITH IMPROVED MUFFLER PORTION

BACKGROUND OF THE INVENTION

The present invention relates to power plant steam chests and in particular, to a steam control valve for a power plant steam chest with an improved muffler portion. In power plants such as nuclear plants, steam control valves are utilized in the steam chest which is in fluid communication with the saturated steam coming from the steam generator. The control valve includes a plug which controls the flow of steam to the outlets of the steam chest. The plug is raised to permit flow of steam to the outlets of the steam chest. The typical steam control valve has an outer housing including a bottom muffler portion having window openings therethrough. The bottom muffler portion both guides the valve plug and attentuates valve flow noise. The bottom muffler portion of the outer housing frequently experiences mechanical damage during operation. The types of damage encountered include cracking of the muffler strut portion and wear and cracking in the the bottom ring area. It has been thought that flow-induced vibration of the valve plug and/or muffler portions is the cause of the damage. It has been found in model tests that large-amplitude plug vibrations initiate above a threshold pressure ratio (or flow rate) for a given plug lift (valve opening). Below the threshold pressure ratio the vibrations appear to have a random character such as would be expected to be caused by turbulence; while above the threshold pressure ratio they have essentially a sinusoidal character, such as would be expected from a self-excited, flow-induced vibration mechanism. Above the threshold pressure ratio, the vibration of the plug increases rapidly and heavy impacting occurs between the plug and the muffler portion. One present muffler portion bottom ring design includes a series of flow holes with an upper band without flow holes adjacent the window openings. It has been found in model tests that this design has an inherent instability threshold pressure ratio (or flow rate) for a given valve lift, above which self-excited vibration initiates. The vibration is due to modulation of the flow through the flow holes and through the annular gap between the plug and the muffler portion. The modulation is caused by the relative vibratory motions of the plug and muffler portion. These vibrations may lead to valve damage and the field damage can be reasonably explained by the self-excited vibration mechanisms identified. It has been found that the self-excited vibration mechanism acting at low valve lifts is related to pneumatic hammer, a known cuase of severe vibration of shafts supported by hydrostatic bearings that use a gaseous fluid or steam. The bottom ring portion of the prior art muffler in the area of the flow holes is similar to a hydrostatic bearing while the plug is similar to a shaft. The self-excited vibration mechanism acting at higher lifts when the plug is in the upper band of the bottom ring is due to gap modulations.

SUMMARY OF THE INVENTION

The present invention eliminates the possibility of pneumatic hammer by removing the hydrostatic bearing features of the plug guide, i.e. flow holes, while still providing mechanical guidance for the valve plug in a flow opening that varies with plug lift. It also eliminates the possibility for gap modulation by removing the upper band in the bottom ring.

The present invention is in combination with a steam control valve for a power plant steam chest. The steam chest typically includes a hollow elongated central member. The central member has a steam inlet means passing therethrough in predetermined position and a steam outlet means passing therethrough in predetermined position. The steam inlet means is at a relatively higher pressure than the steam outlet means. Throttle valve means are positioned proximate the inlet means. The central member has control valve aperture means passing therethrough in predetermined position.

The steam control valve typically includes a cylindrical outer housing having a lip member affixed to the upper end thereof. The lip member has an outside diameter greater than the control valve aperture. The outer housing passes through the control valve aperture and is maintained in predetermined position by the lip member. The outer housing includes a bottom muffler portion. The bottom muffler portion has window openings of predetermined dimensions therethrough spaced about the circumference thereof. The bottoms of the window openings are a predetermined distance above the bottom of the bottom muffler portion. The bottom muffler portion of the outer housing has an initial inside diameter greater than the final inside diameter of the remaining portion of the outer housing. A movable plug for controllably sealing the high pressure inlet means from the low pressure outlet means is provided. The movable plug is coaxially aligned with the outer housing means and slidable within the interior of the housing. Shaft means are provided for moving the plug and affixed at one end thereof to the plug. Lifting means are provided affixed to the other end of the shaft means for lifting the plug. The plug has grooves therein about the circumference thereof in predetermined position. Circular seal rings of predetermined circumference are provided. The seal rings are sized to be insertable into the grooves. The steam control valve described thus far is conventional.

The improvement comprises a bottom ring portion disposed between the bottom of the window openings and the bottom of the bottom muffler portion. The bottom ring portion has a plurality of pockets therein about the inner circumference thereof. Each of the pockets has a steam exit portion having an initial central diameter equal to the inside diameter of the bottom portion of the outer housing. Each of the pockets have a final central diameter at the steam entrance portion of the pocket a predetermined amount larger than the initial center diameter of the outer housing. The steam entrance portion of each of the pockets are disposed within the bottom of the aligned window openings, the exit portion being a predetermined distance above the bottom of the outer housing, whereby when the plug is initially lifted by the lifting means, steam at the high pressure inlet means flows through the window openings and through the pockets. As the plug is raised the steam flow through the pockets is increased without damaging vibration of the outer housing and plug. Preferably, the side of the pocket between the entrance portion of the pocket and the exit portion of the pocket is offset at an angle, typically 26° from the vertical.

BRIEF DESCRIPTION OF THE DRAWINGS

For a better understanding of the invention reference may be had to the accompanying drawings in which.

DESCRIPTION OF THE PREFERRED EMBODIMENTS

Figure 1:
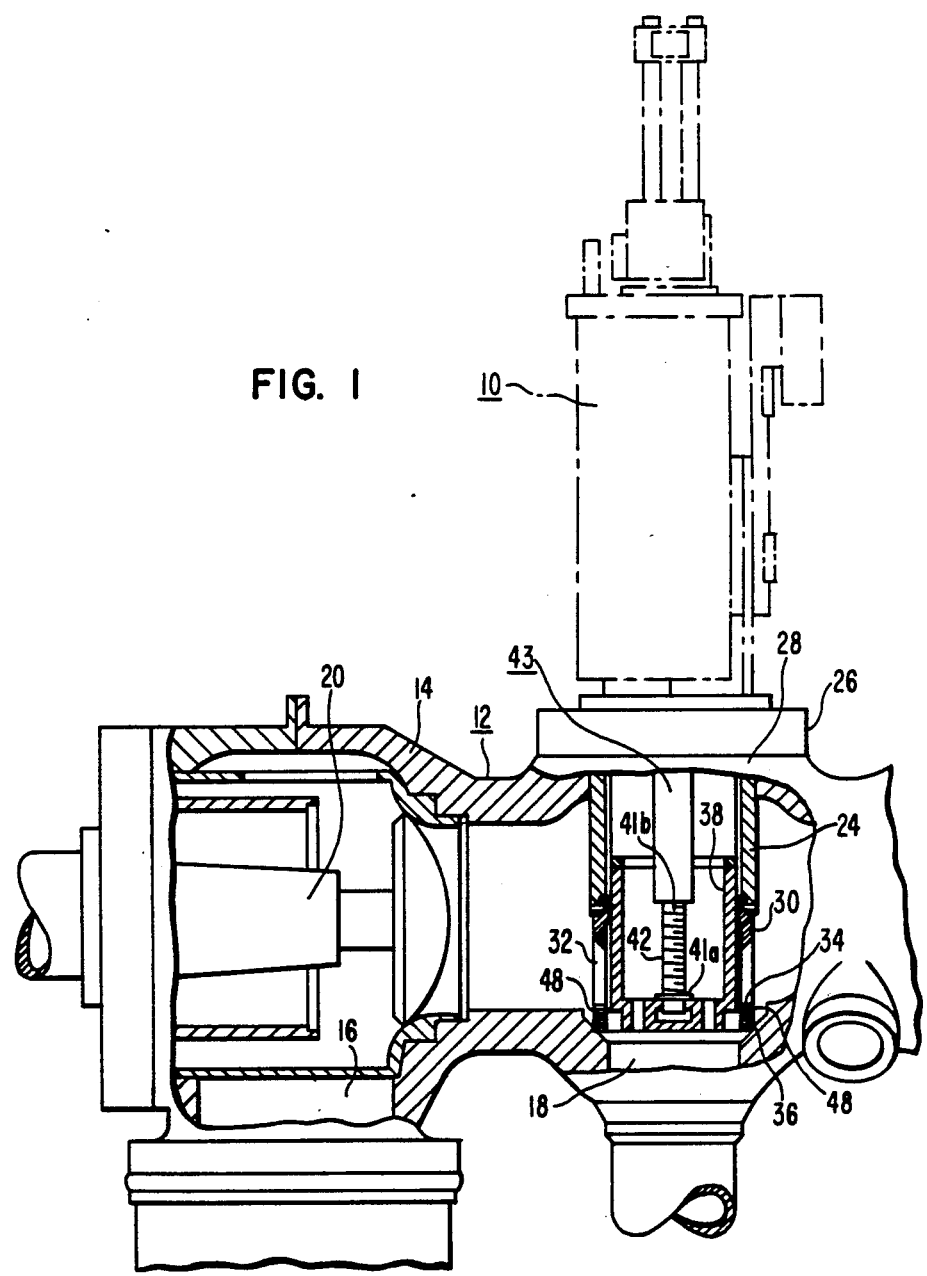
FIG. 1 is an elevational view partly broken away of a portion of a typical steam chest.

Referring to FIG. 1 there is shown a steam control valve 10 for a power plant steam chest 12. The steam chest 12 includes a hollow elongated central member 14. Central member 14 has a steam inlet means 16 passing therethrough in predetermined position as shown in FIG. 1. The central member 14 also has a steam outlet means 18 passing therethrough in predetermined position. Steam inlet means is at a relatively higher pressure than the steam outlet means. For example the pressure at the steam inlet 16 may be 1000 psia and the pressure at the steam outlet 18 200 psia, for example. In a nuclear power plant the throttle valve controls the flow of steam from the steam generator to the steam chest as is known in the art. The central member has control valve aperture means 22 passing therethrough in predetermined position. The control valve 10 includes a cylindrical outer housing means 24 having a lip member 26 affixed to the upper end 28 thereof.

The lip member 26 has an outside diameter such as 40 inches which is greater than the control valve aperture 22 which typically has a diameter of 25 inches. The outer housing 24 passes through the control valve aperture and is maintained in predetermined position by the lip member 26. The outer housing 24 includes a bottom muffler portion 30. The bottom muffler portion 30 has eight window opening means therethrough 32 of predetermined dimensions such as 9×6.5 and spaced about the circumference of the bottom muffler portion. The bottoms 34 of the window openings 32 are a predetermined distance such as 4.0 inches above the bottom 36 of the bottom muffler portion 30. The bottom muffler portion 30 of the outer housing 24 has an initial inside diameter such as 20 inches which is greater than the final inside diameter which is 19.4 inches of the remaining portion of the outer housing 24 above the muffler portion.

Figure 2:
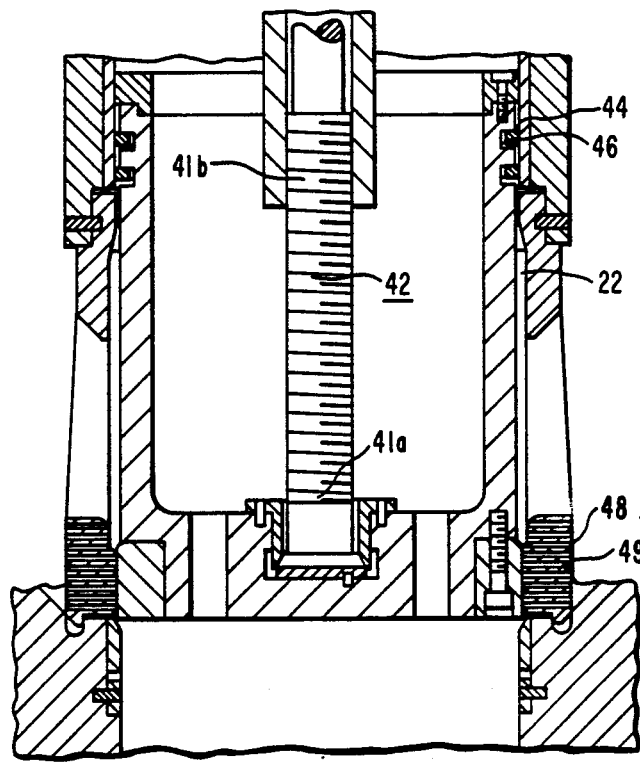
FIG. 2 is a cross-sectional elevational view of a portion of the steam control valve showing the outer housing in the proximity of the bottom muffler portion of the prior art and showing the plug in the closed position.

A movable plug 38 is provided for controllably sealing the high pressure inlet means 16 from the relatively low pressure outlet means 18 as is known in the art. The movable plug 38 is coaxially aligned with the outer housing 24 and is slidable within the interior 40 of the outer housing. Shaft means 42 for moving the plug is provided as is known in the art. The shaft means 42 for moving the plug is affixed at one end 41a to the plug in predetermined position as shown in FIGS. 1 and 2. The shaft means 42 is affixed at the other end 41b to lifting means 43 which is conventional. The plug 38 preferably has groove means 44 therein about the circumference thereof in predetermined position as shown in FIG. 2. Circular seal ring means 46 is provided preferably split pressure rings. The circular seal ring means 46 is sized to be insertable into the groove means. The steam control valve 10 is described thus far as conventional.

Figure 3:
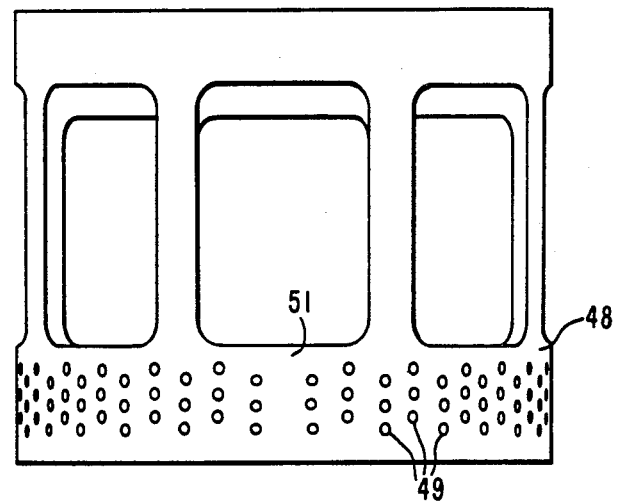
FIG. 3 is an elevational view of the bottom muffler portion of the outer housing showing the prior art bottom ring portion.

The improvement comprises a bottom ring portion 48. The prior art bottom ring portion is shown in FIGS. 2 and 3. As discussed previously the bottom ring portion of the prior art comprised a plurality of flowholes 49 disposed therethrough and upper band 51 without flowholes adjacent the window openings. The bottom ring portion of the present invention is shown in FIGS. 4-8. The bottom ring portion 48 of the present invention has a plurality of pockets 50 therein about the inner circumference 52 thereof. Each of the tapered pockets 50 is of predetermined dimensions such as about 5 inches wide, 3.8 inches high and 1.8 inches deep at the top of the ring. Each of the pockets is aligned with one of the window openings 32. As shown in FIG. 6 each of the pockets 50 has a steam exit portion 52 having an initial central diameter 54 substantially equal to the inside diameter of the bottom muffler portion 30 of the outer housing 24. Each of the pockets 50 has a final central diameter 56 at the steam entrance portion 58 of the pocket 50 a predetermined amount larger than the initial central diameter of the steam exit portion 30 of the outer housing 24 with the steam entrance portion 58 of each of the pockets 50 being disposed with in bottom 34 of the aligned window openings 32. The exit portion 52 of the pocket 50 being a predetermined distance such as 0.20 inches above the bottom of the outer housing 24. A channel 60 is provided at the bottom of the muffler portion for engaging said central member 14 as shown in FIGS. 5 and 6 in the same manner as in the prior art.

Figure 4:
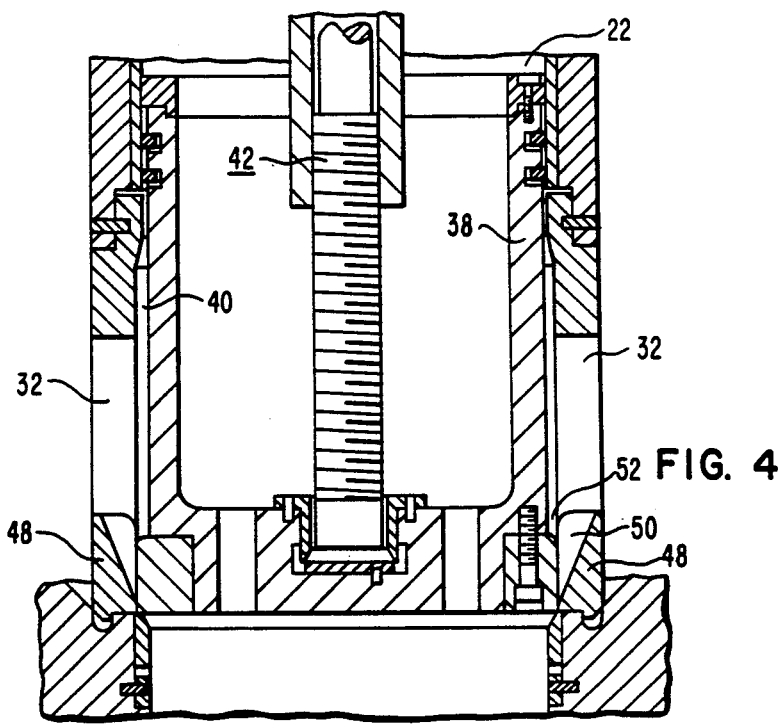
FIG. 4 is a cross-sectional elevational view of a portion of the steam control valve in the proximity of the bottom muffler portion showing the muffler portion of the present invention with the plug in the closed position.
Figure 5:
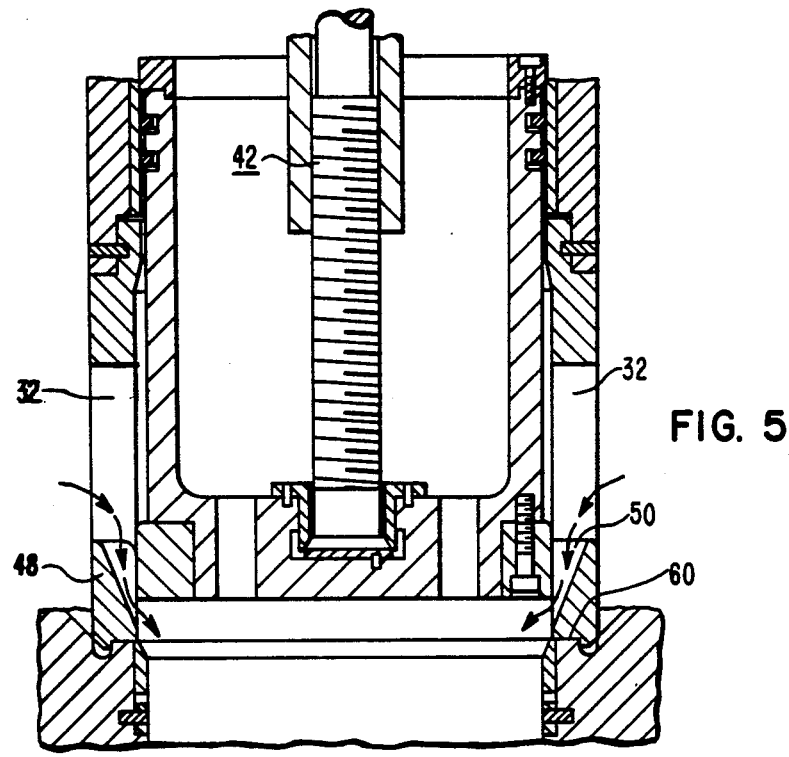
FIG. 5 is the same as FIG. 4 with the exception that the plug is in the partially open position.
Figure 6:
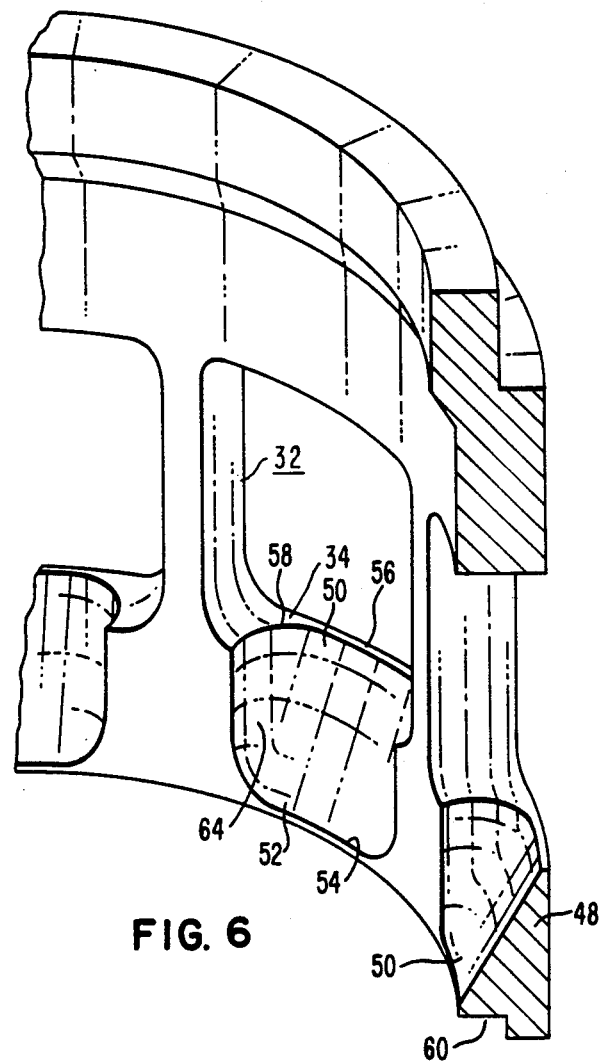
FIG. 6 is an isometric view of a portion of the bottom muffler portion showing the pockets in relationship to the window openings.
Figure 7:
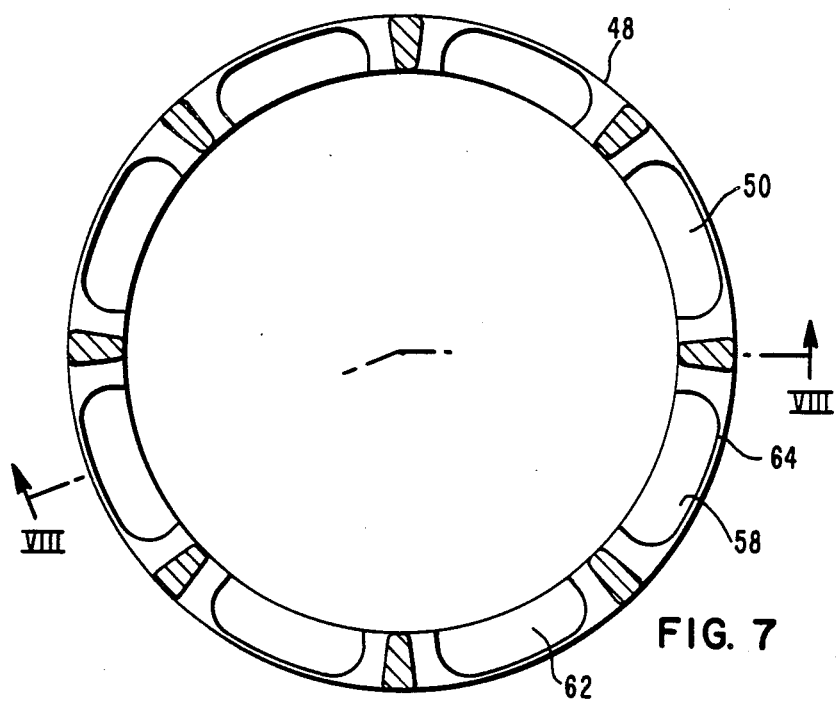
FIG. 7 is a cross-sectional view of the bottom ring portion taken along the line A—A of FIG. 5; and, FIG. 8 is a cross-sectional elevational view taken along the line VIII—VIII of FIG. 7.
Figure 8:
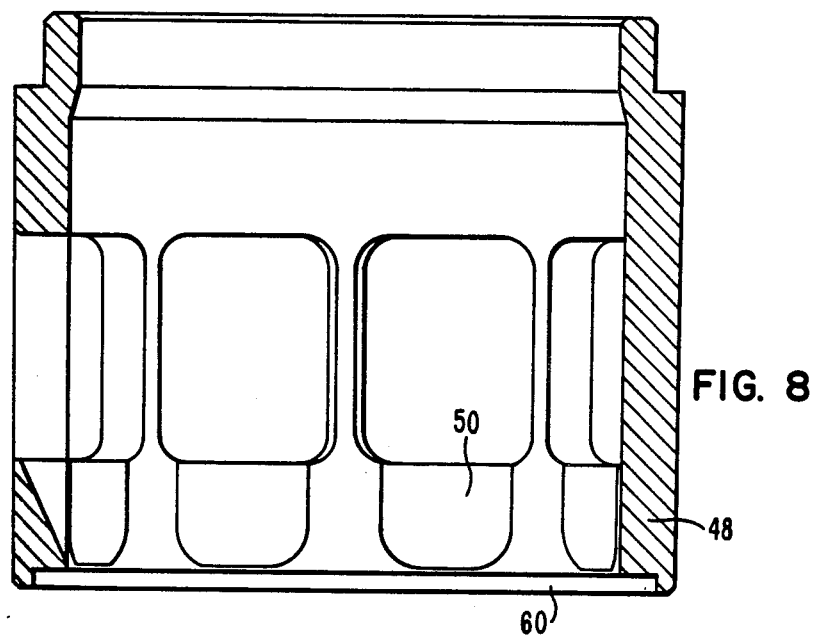

With reference to FIGS. 4 and 5 utilizing the present invention when the plug 38 is initially lifted by the lifting means 43, steam at the high pressure inlet 16 flows through the window openings 32 and through the pockets 50. As the plug is raised the steam flow through the pockets is increased without damaging vibration of the outer housing means and plug.

Preferably the wall portion 62 of the ring portion 48 from the entrance portion 58 to the exit portion 52 of each of the pockets is offset from the vertical. The entrance portion 58 to the exit portion 52 is typically at an angle offset 26° from the vertical as shown in FIG. 6. Preferably the side portions 64 of the ring portion 48 proximate said pockets have a predetermined curvature such as a 1.25 inches radius.

We claim:

1. In combination with a steam control valve for a power plant steam chest, said steam chest including a hollow elongated central member, said central member having a steam inlet means passing therethrough in predetermined position and a steam outlet means passing therethrough in predetermined position, said steam inlet means at a relatively higher pressure than said steam outlet means, throttle valve means positioned proximate said inlet means, said central member having control valve aperture means passing therethrough, said steam control valve including a cylindrical outer housing means having a lip member affixed to the upper end thereof, said lip member having an outside diameter greater than said control valve aperture, said outer housing means passing through said control valve aperture and maintained in predetermined position by said lip member, said outer housing means including a bottom muffler portion, said bottom muffler portion having window opening means of predetermined dimensions therethrough and spaced about the circumference thereof, the bottoms of said window opening means a predetermined distance above the bottom of said bottom muffler portion, said bottom muffler portion of said outer housing having an initial inside diameter greater than the final inside diameter of the remaining portion of said outer housing, a movable plug for controllably sealing said high pressure inlet means from said relatively low pressure outlet means, said movable plug coaxially aligned with said outer housing means and slidable within the interior of said housing means, shaft means for moving said plug at one end affixed to said plug in predetermined position, lifting means affixed to the other end of said shaft means for lifting said plug, said plug having groove means therein about the circumference thereof in predetermined position, circular seal ring means sized to be insertable into said groove means, the improvement which comprises:

a bottom ring portion disposed between the bottom of said window opening means and the bottom of said bottom muffler portion, said window ring portion having a plurality of pockets therein about the inner circumference thereof, each of said pockets of predetermined dimensions and aligned with one of said window opening means, each of said pockets having a steam exit portion having an initial central diameter equal to the inside diameter of the bottom muffler portion of said outer housing and each of said pockets having a final central diameter at the steam entrance portion of said pocket a predetermined amount larger than the initial central diameter of said steam exit portion of said pocket, the steam entrance portion of each of said pockets are disposed within said bottom of said aligned window opening means, said steam exit portion of each of said pockets being a predetermined distance above the bottom of said outer housing, whereby when said plug is initially lifted by said lifting means, steam at said high pressure inlet means flows through said window opening means and through said pockets without damaging vibration of said outer housing means and plug.

2. The steam control valve of claim 1, wherein the wall portions of said ring portion proximate each of said pockets from said steam entrance portion to said steam exit portion is at an angle offset from the vertical.

3. The steam control valve of claim 1, wherein the side portions of the ring portion proximate said pockets have a predetermined curvature.

* * * * *